(12) United States Patent
Brownell et al.

(10) Patent No.: US 9,845,008 B2
(45) Date of Patent: Dec. 19, 2017

(54) SYSTEM AND METHOD OF DETECTING LOAD FORCES ON A TRACTION VEHICLE TO PREDICT WHEEL SLIP

(71) Applicant: Deere & Company, Moline, IL (US)

(72) Inventors: Douglas K. Brownell, Independence, KS (US); Kyle K. McKinzie, Altamont, KS (US)

(73) Assignee: DEERE & COMPANY, Moline, IL (US)

( * ) Notice: Subject to any disclaimer, the term of this patent is extended or adjusted under 35 U.S.C. 154(b) by 21 days.

(21) Appl. No.: 14/845,192

(22) Filed: Sep. 3, 2015

(65) Prior Publication Data

US 2017/0066325 A1   Mar. 9, 2017

(51) Int. Cl.
| | |
|---|---|
| *B60K 28/16* | (2006.01) |
| *B60W 30/18* | (2012.01) |
| *B60W 10/06* | (2006.01) |
| *B60W 10/30* | (2006.01) |
| *B60W 30/188* | (2012.01) |

(52) U.S. Cl.
CPC ............ *B60K 28/16* (2013.01); *B60K 28/165* (2013.01); *B60W 10/06* (2013.01); *B60W 10/30* (2013.01); *B60W 30/1886* (2013.01); *B60W 30/18172* (2013.01); *B60W 2520/26* (2013.01); *B60Y 2200/41* (2013.01); *B60Y 2200/411* (2013.01)

(58) Field of Classification Search
CPC ............ B60K 28/16; B60W 30/18172; B60W 30/188
See application file for complete search history.

(56) References Cited

U.S. PATENT DOCUMENTS

| | | | |
|---|---|---|---|
| 3,913,680 A | 10/1975 | Carlson | |
| 4,037,544 A | 7/1977 | Cantone | |
| 4,157,118 A * | 6/1979 | Suganami | ............... E02F 3/845 |
| | | | 172/12 |
| 4,177,870 A | 12/1979 | Henn | |
| 4,518,044 A | 5/1985 | Wiegardt et al. | |

(Continued)

FOREIGN PATENT DOCUMENTS

| | | |
|---|---|---|
| DE | 1937314 | 2/1971 |
| DE | 3017570 | 11/1981 |

(Continued)

OTHER PUBLICATIONS

Office Action from the US Patent and Trademark Office for U.S. Appl. No. 14/845,186 dated Jan. 27, 2017 (11 pages).

(Continued)

*Primary Examiner* — Kevin Hurley
*Assistant Examiner* — Michael R Stabley
(74) *Attorney, Agent, or Firm* — Michael Best & Friedrich LLP

(57) ABSTRACT

A method of minimizing the occurrence of wheel slip in a traction vehicle includes a drivetrain, at least one wheel for providing tractive effort on a support surface, and a ground-engaging implement moveable relative to the support surface. The method includes estimating a first force acting against the ground-engaging implement, estimating a second force provided by the at least one wheel operable to move the vehicle on the support surface, and controlling the ground-engaging implement based on a difference between the first force and the second force.

14 Claims, 4 Drawing Sheets

(56) References Cited

U.S. PATENT DOCUMENTS

| | | | |
|---|---|---|---|
| 4,846,283 A | 7/1989 | Batcheller | |
| 5,147,010 A | 9/1992 | Olson et al. | |
| 5,505,267 A | 4/1996 | Orbach et al. | |
| 5,564,507 A | 10/1996 | Matsushita et al. | |
| 5,613,581 A | 3/1997 | Fonkalsrud et al. | |
| 5,684,691 A * | 11/1997 | Orbach | A01B 63/112 172/2 |
| 5,755,291 A | 5/1998 | Orbach et al. | |
| 5,911,769 A | 6/1999 | Orbach et al. | |
| 6,119,786 A | 9/2000 | Creger et al. | |
| 6,144,910 A | 11/2000 | Scarlett et al. | |
| 6,162,146 A | 12/2000 | Hoefling | |
| 6,234,254 B1 * | 5/2001 | Dietz | A01B 67/00 172/3 |
| 6,317,676 B1 | 11/2001 | Gengler et al. | |
| 6,405,844 B1 | 6/2002 | Takamatsu | |
| 6,857,494 B2 | 2/2005 | Kobayashi et al. | |
| 7,452,306 B2 | 11/2008 | Casey | |
| 7,734,398 B2 | 6/2010 | Manneppalli | |
| 7,770,681 B2 | 8/2010 | Marathe et al. | |
| 7,779,947 B2 | 8/2010 | Stratton | |
| 7,867,136 B2 | 1/2011 | Schifferer | |
| 7,974,756 B2 | 7/2011 | Ikari | |
| 8,060,284 B2 | 11/2011 | Hendryx | |
| 8,083,004 B2 | 12/2011 | Knight, Jr. | |
| 8,103,417 B2 | 1/2012 | Gharsalli et al. | |
| 8,175,785 B2 | 5/2012 | Turski et al. | |
| 8,540,048 B2 | 9/2013 | Will et al. | |
| 8,600,621 B2 | 12/2013 | Callaway et al. | |
| 8,626,404 B2 | 1/2014 | Thomson et al. | |
| 8,726,543 B2 | 5/2014 | Kelly | |
| 8,788,160 B2 | 7/2014 | Lorentz et al. | |
| 8,825,314 B2 | 9/2014 | Jensen | |
| 8,880,301 B2 | 11/2014 | Velde | |
| 8,983,739 B2 | 3/2015 | Faivre | |
| 9,086,104 B2 | 7/2015 | McCann et al. | |
| 9,213,331 B2 | 12/2015 | Johnson et al. | |
| 2001/0056319 A1 | 12/2001 | Rocke | |
| 2003/0121674 A1 | 7/2003 | Scarlett et al. | |
| 2006/0042838 A1 | 3/2006 | Yeoman et al. | |
| 2006/0245896 A1 | 11/2006 | Alshaer et al. | |
| 2006/0287792 A1 | 12/2006 | Jarrett | |
| 2008/0234901 A1 | 9/2008 | Johnson et al. | |
| 2008/0234902 A1 | 9/2008 | Johnson et al. | |
| 2008/0257569 A1 | 10/2008 | Foster et al. | |
| 2008/0257570 A1 | 10/2008 | Keplinger et al. | |
| 2009/0223215 A1 | 9/2009 | Kelly et al. | |
| 2010/0009806 A1 | 1/2010 | Shirao et al. | |
| 2010/0174454 A1 | 7/2010 | Saito | |
| 2010/0300711 A1 | 12/2010 | Pirotais | |
| 2012/0133202 A1 | 5/2012 | Mui et al. | |
| 2012/0239260 A1 | 9/2012 | Ishikawa et al. | |
| 2012/0293316 A1 | 11/2012 | Johnson et al. | |
| 2013/0085036 A1 | 4/2013 | Anderson | |
| 2013/0103273 A1 | 4/2013 | von Schönebeck et al. | |
| 2013/0158804 A1 | 6/2013 | Callaway et al. | |
| 2013/0173122 A1 | 7/2013 | Liu et al. | |
| 2014/0005899 A1 | 1/2014 | Byers et al. | |
| 2014/0039772 A1 | 2/2014 | Jensen | |
| 2014/0121911 A1 | 5/2014 | Davis et al. | |
| 2014/0200775 A1 | 7/2014 | Shirao | |
| 2014/0277966 A1 | 9/2014 | Kelly | |
| 2014/0343800 A1 | 11/2014 | Nelson | |
| 2015/0120103 A1 | 4/2015 | Keys, II et al. | |
| 2015/0139767 A1 | 5/2015 | Moriki et al. | |
| 2015/0149054 A1 | 5/2015 | Gentle et al. | |
| 2015/0233094 A1 | 8/2015 | Maiyur | |
| 2016/0032564 A1 | 2/2016 | Pinther, II et al. | |
| 2016/0160470 A1 | 6/2016 | Kishimoto et al. | |

FOREIGN PATENT DOCUMENTS

| | | |
|---|---|---|
| DE | 3230330 | 2/1984 |
| DE | 3604218 | 2/1987 |
| DE | 4316421 | 11/1994 |
| DE | 69030503 | 10/1997 |
| DE | 19939442 | 2/2001 |
| DE | 10351376 | 5/2004 |
| DE | 102014206234 | 10/2015 |
| EP | 0241748 | 10/1987 |
| EP | 0338141 | 10/1989 |
| EP | 0500403 | 8/1992 |
| EP | 2556735 | 2/2013 |
| GB | 1086662 | 10/1967 |
| GB | 2428755 | 2/2007 |
| JP | H0790879 | 4/1995 |
| JP | H7090879 | 4/1995 |

OTHER PUBLICATIONS

Final Office Action from the US Patent and Trademark Office for U.S. Appl. No. 14/845,190 dated Mar. 24, 2017 (7 pages).

Office Action from the US Patent and Trademark Office for U.S. Appl. No. 14/845,190 dated Nov. 29, 2016 (6 pages).

DE102016216587.9 Search Report from the German Intellectual Property Office dated May 10, 2017 (9 pages, which includes a Statement of Relevance).

DE102016216584.4 Search Report from the German Intellectual Property Office dated May 10, 2017 (9 pages, which includes a Statement of Relevance).

DE102016216588.7 Search Report from the German Intellectual Property Office dated May 16, 2017 (11 pages, which includes a Statement of Relevance).

DE102016216649.2 Search Report from the German Intellectual Property Office dated Jul. 19, 2017 (13 pages, which includes a Statement of Relevance).

Office Action from the US Patent and Trademark Office for U.S. Appl. No. 14/845,186 dated Jul. 27, 2017 (15 pages).

* cited by examiner

SYSTEM AND METHOD OF DETECTING LOAD FORCES ON A TRACTION VEHICLE TO PREDICT WHEEL SLIP

BACKGROUND

The present disclosure relates to detecting load forces on a traction vehicle to predict wheel slip.

When a traction vehicle, such as a motor grader, is in low traction conditions, wheel slip can cause the vehicle to become less productive and can also degrade the quality of the support surface under the wheel. Traction of the traction vehicle in low traction conditions is enhanced when wheel slip is minimized.

SUMMARY

Providing a method of predicting wheel slip in a traction control system will improve the quality of the support surface left behind the vehicle, improve vehicle productivity, assist novice vehicle operators, and reduce the workload of experienced vehicle operators.

In one aspect, the disclosure provides a method of minimizing the occurrence of wheel slip in a traction vehicle including a drivetrain, at least one wheel for providing tractive effort on a support surface, and a ground-engaging implement moveable relative to the support surface. The method includes estimating a first force acting against the ground-engaging implement, estimating a second force provided by the at least one wheel operable to move the vehicle on the support surface, and controlling the ground-engaging implement based on a difference between the first force and the second force.

In another aspect, the disclosure provides a method of minimizing the occurrence of wheel slip in a traction vehicle including a drivetrain, at least one wheel for providing tractive effort on a support surface, and a ground-engaging implement moveable relative to the support surface. The method includes estimating a first force acting against the ground-engaging implement, estimating a second force provided by the at least one wheel operable to move the vehicle on the support surface, and applying a differential lock to the at least one wheel for co-rotation with a second wheel of the vehicle.

In yet another aspect, the disclosure provides a system for minimizing the occurrence of wheel slip in a traction vehicle including a drivetrain, at least one wheel for providing tractive effort on a support surface, and a ground-engaging implement moveable relative to the support surface. The system includes a controller configured to estimate a first force acting against the ground-engaging implement, estimate a second force provided by the at least one wheel operable to move the vehicle on the support surface, and control at least one of the ground-engaging implement or the drivetrain based on a difference between the first force and the second force.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and implementation of components set forth in the following description or illustrated in the following drawings. The disclosure is capable of other embodiments and of being practiced or of being carried out in various ways.

Figure 1A:
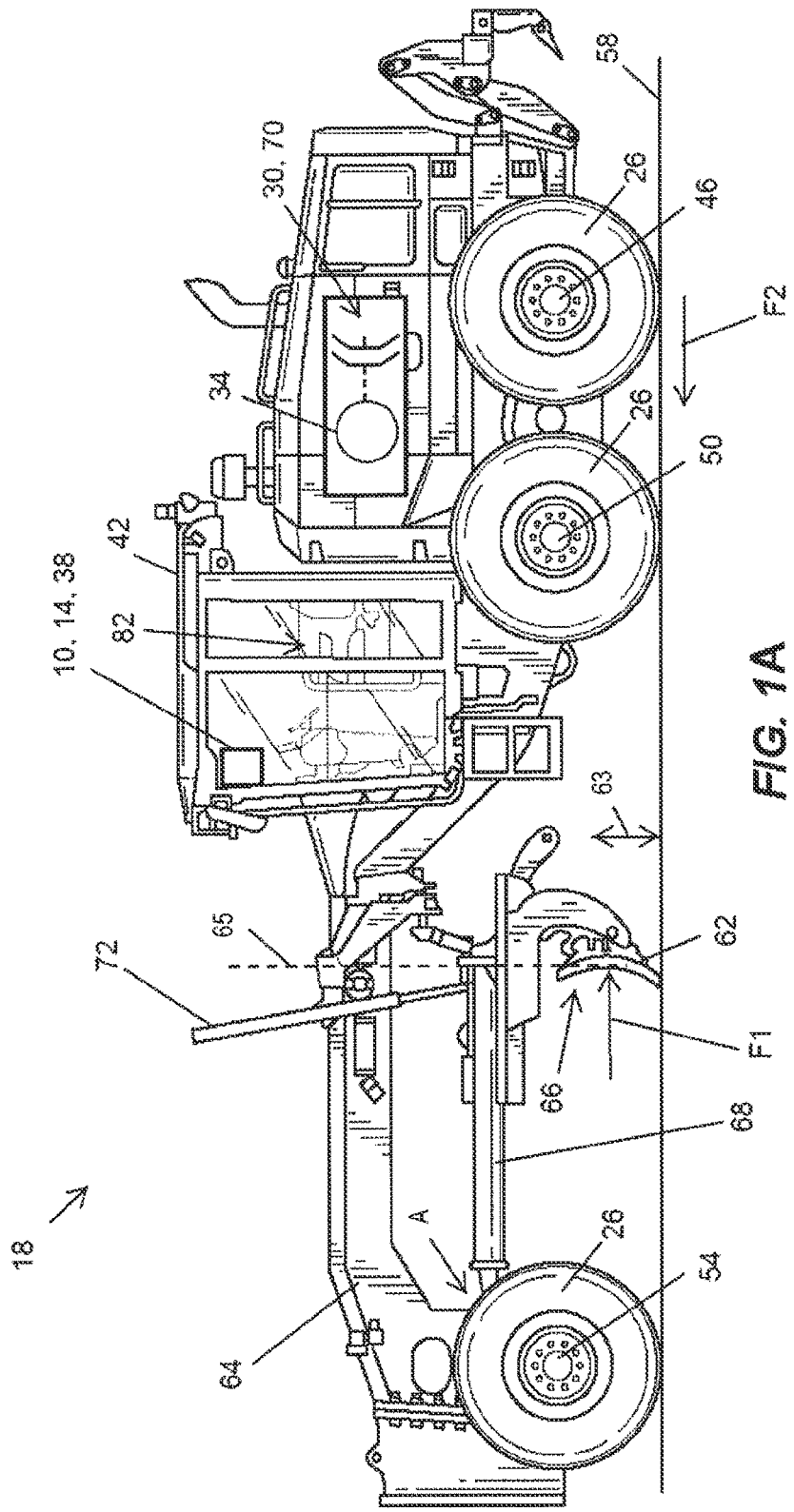
FIG. 1A is a traction vehicle with a traction control system in accordance with the present disclosure.
Figure 1B:
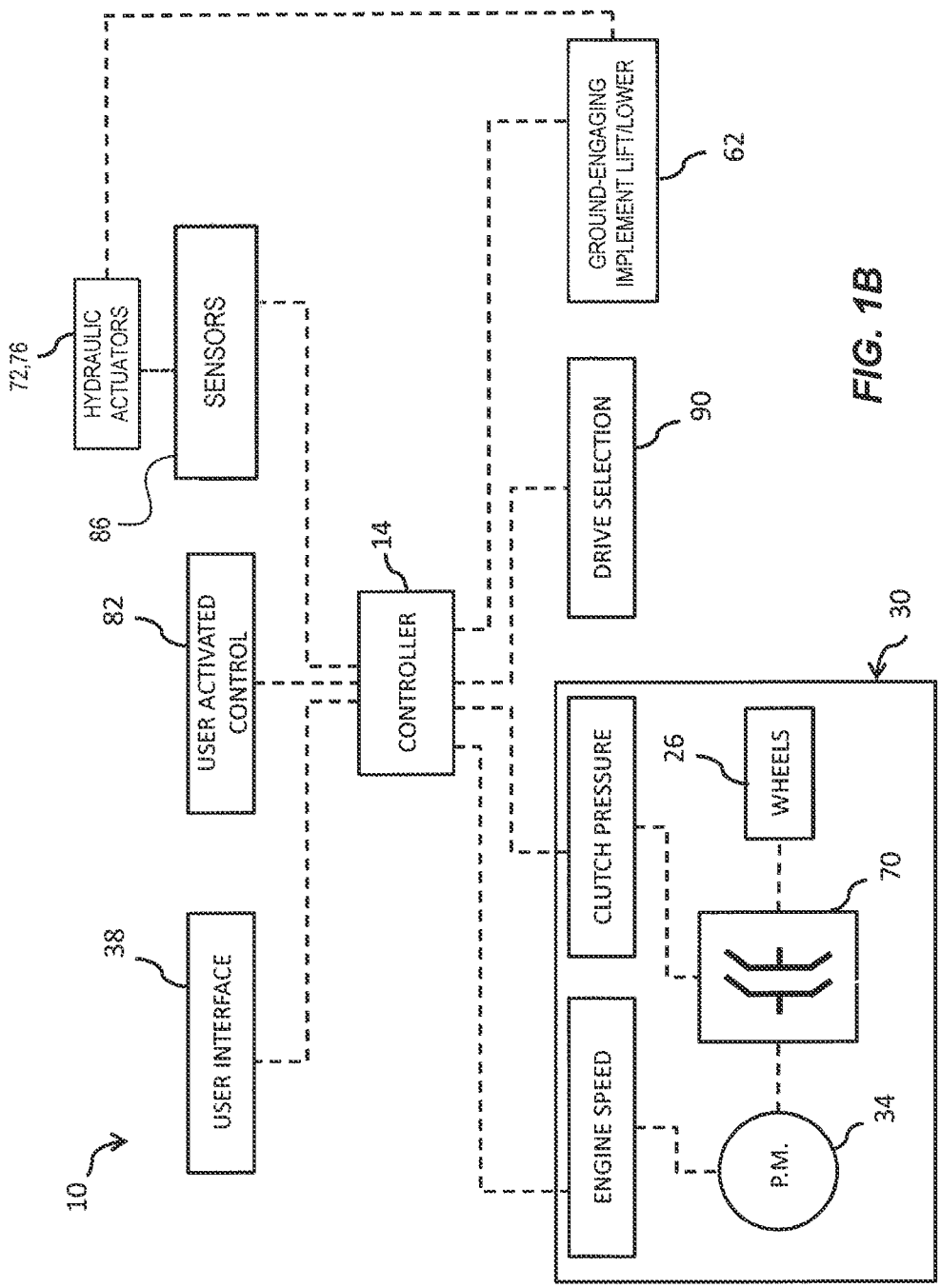
FIG. 1B is a schematic illustration of the traction control system for the traction vehicle of FIG. 1A.

A traction control system 10, illustrated schematically in FIG. 1B, having a controller 14 is described herein for a fraction vehicle 18. For example, the traction vehicle 18 may include a motor grader as shown in FIG. 1A. However, the traction control system 10 described herein is not limited in its application to motor graders and may be applied to other fraction vehicles. For example, the traction control system 10 can be used on vehicles such as but not limited to earth moving equipment, construction equipment, snow removal equipment, sand moving equipment, forestry harvesting equipment, agricultural equipment, cargo moving equipment, mining equipment, on highway equipment, automotive vehicles, etc. The traction control system 10 can also be used on other vehicles equipped with a ground-engaging implement that increases the load on the traction vehicle 18, as will be discussed in greater detail below.

By way of example, FIG. 1A illustrates the traction vehicle 18, e.g., a motor grader, having a plurality of axles 46, 50, 54 and a plurality of drive wheels 26, the axles and wheels driven by a drivetrain 30 including a prime mover 34 and a transmission 70. The traction vehicle 18 may have any number of axles and drive wheels. For example, the vehicle 18 may have a first axle 46, a second axle 50, a third axle 54, and six drive wheels 26 corresponding therewith, as illustrated. The drivetrain 30 may provide power to drive some or all of the wheels 26, e.g., only the rear wheels, both the front and rear wheels, etc. The vehicle 18 may include drive wheels 26 having tires, continuous tracks, or other traction devices that engage a support surface 58 (e.g., the ground). The drive wheels 26 interact directly with the support surface 58 and are responsible for vehicle 18 movement and tractive effort.

The prime mover 34 may include any power source to provide rotational driveline power. For example, the prime mover 34 may include, but is not limited to, an internal combustion engine, a piston engine, a rotary engine, a hydraulic motor, a hydrostatic system, an electric motor, etc. The term "engine" used throughout this document (e.g., as in "engine speed") refers generally to the prime mover 34 and is not limited to an engine or any particular type of prime mover.

The transmission 70 may include a single-speed or multi-speed transmission, or infinitely-variable transmission through direct coupling means, torque converter drives, hydrostatic drives, electric motor drives, or any other transmission known now or in the future to those having ordinary skill in the art. For the purpose of the examples used herein, a direct drive multi-speed transmission is used. However, application is not limited to a direct drive transmission system. The traction control system 10 can be applied to any power transmission system. Output power from the transmission drives the drive wheels 26 and may be geared directly to the drive wheels 26.

Figure 2:
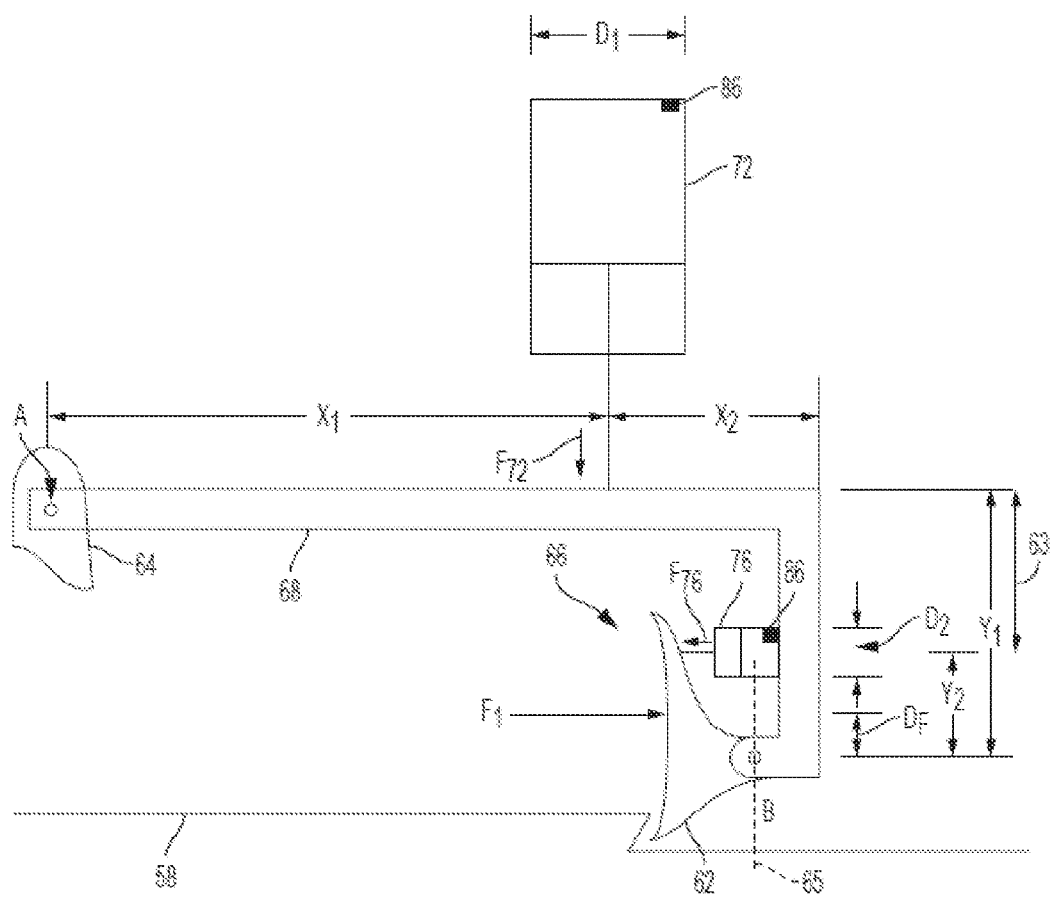
FIG. 2 is a detailed view of a portion of the traction vehicle illustrating, among other things, a drag force acting against a ground-engaging implement.

With reference to FIGS. 1A and 2, the illustrated fraction vehicle 18 includes a ground-engaging implement 62 (referenced herein as a blade) located between the second and third axles 50, 54. Generally, the blade 62 scrapes the support surface 58 to flatten the support surface 58 during a grading operation. The blade 62 is coupled to at least two attachment points on a frame 64 of the traction vehicle 18. In particular, a blade arm 68 coupled to the blade 62 is additionally coupled to the frame 64 by a plurality of lift hydraulic cylinders or actuators 72 (only one of which is shown in FIGS. 1A and 2) and by a pivot attachment point A located adjacent the third axle 54. The blade 62 is configured for movement generally up and down with respect to the support surface 58 by the lift hydraulic cylinder 72, e.g., in a direction 63 generally normal to the support surface 58, towards and away from the support surface 58. In other words, the lift hydraulic cylinder 72 is operable to move the blade arm 68 in the direction 63, which in turn, moves the blade 62 in the direction 63. The lift hydraulic cylinder 72 is located at a horizontal distance $X_1$ from the pivot attachment point A and a horizontal distance $X_2$ from an edge of the blade arm 68 opposite the pivot attachment point A. In the illustrated implementation, the horizontal distance $X_1$ is about eight feet and the horizontal distance $X_2$ is about two feet; however, in other implementations, the horizontal distances $X_1$, $X_2$ may define different distances. The illustrated lift hydraulic cylinder 72 includes a piston diameter $D_1$. In the illustrated implementation, the piston diameter $D_1$ is about six inches; however, in other implementations, the piston diameter $D_1$ may be of a different diameter.

With reference to FIG. 2, the blade 62 may also pivot along a vertical axis 65 about pivot point B (e.g., normal to the support surface 58) for turning a face 66 of the blade 62 from the front towards the sides by a plurality of blade angle hydraulic cylinders or actuators 76 (only one of which is shown in FIG. 2). Pivot point B is the pivoting point of the blade 62 relative to the blade arm 68 such that the blade 62 can rotate about a plurality of axes similarly to a ball and socket joint. As such, the blade 62 may be pivotable about additional axes not disclosed in detail herein by the blade angle hydraulic cylinder 76. A vertical distance $Y_1$ is defined by a vertical portion of the blade arm 68 located between pivot point B and a horizontal portion of the blade arm 68. The illustrated blade angle hydraulic cylinder 76 is located at a vertical distance $Y_2$ from the pivot point B. In the illustrated implementation, the vertical distance $Y_1$ is about two feet and the vertical distance $Y_2$ is about one foot; however, in other implementations, the vertical distances $Y_1$, $Y_2$ may define different distances. The illustrated blade angle hydraulic cylinder 76 includes a piston diameter $D_2$. In the illustrated implementation, the piston diameter $D_2$ is about four inches; however, in other implementations, the piston diameter $D_2$ may be of a different diameter. In addition, the blade 62 may also be located in front of the forward-most axle (e.g., the third axle 54), behind the rearward-most axle (e.g., the first axle 46), or in between other axles. In yet other implementations, the traction vehicle 18 may include two or more blades 62 in these or other locations, and/or other implements such as ploughs, sweepers, shovels, rippers, etc.

A user-activated control 82 (e.g., a joystick control) is located within a cab 42 of the traction vehicle 18 and is operable for manual movement of the blade 62 (FIG. 1A). In the illustrated implementation, the joystick control 82 moves radially in two opposing directions. The joystick control 82 is also biased in a neutral position. The neutral position corresponds to a stationary height of the blade 62 relative to the support surface 58. Stated another way, when the joystick control 82 is in the neutral position, the blade 62 does not move with respect to the frame 64. With movement of the joystick control 82 in a forward direction (e.g., away from an operator seated within the cab 42), the blade 62 lowers towards and/or into the support surface 58. In contrast, with movement of the joystick control 82 in a rearward direction (e.g., towards the operator seated within the cab 42), the blade 62 raises away from the support surface 58. The degree or the amount of movement of the user-activated control 82 from the neutral position corresponds to different rates of movement of the blade 62.

Referring again to FIGS. 1A and 1B, the traction vehicle 18 may have a user interface 38 for system operation, which may be located in the cab 42 of the fraction vehicle 18, another location on the vehicle, or remote from the vehicle (e.g., the user interface may be a personal portable device with wireless communication to the controller). The controller 14 receives input from the user interface 38, from the joystick control 82, and from a plurality of sensors 86. The controller 14 also has outputs for controlling the prime mover 34, the transmission 70, power transmission drive selection 90 (e.g., to direct power to the rear wheels, the front wheels, all wheels, etc.), and the blade 62. Thus, the controller 14 is operatively coupled to the transmission 70, the prime mover 34, the blade 62, and the drive selection 90. In addition, the user interface 38 is utilized to select a tractive condition of the support surface 58. For example, if the support surface 58 is in a low (e.g., loose soil) or high (e.g., compacted soil) tractive condition, a corresponding setting on the user interface 38 is selected. In other implementations, the user interface 38 may include more than two tractive condition settings and/or may include settings adapted for different weather conditions (e.g., snow, rain, etc.).

With reference to FIG. 2, the sensors 86 include pressure sensors coupled within the hydraulic cylinders 72, 76 and are configured to measure a pressure within the hydraulic cylinders 72, 76. In other implementations, the sensors 86 may be located externally from the hydraulic cylinders 72, 76. The controller 14 includes a processor for making calculations, comparisons, and executing logic described in further detail below. Additional sensors 86 may be coupled to other features of the traction vehicle 18. For example, the sensors 86 may measure engine speed of the prime mover 34 and/or clutch pressure of the transmission 70.

As described below in further detail, it may be desirable to predict when wheel slip between the wheels 26 and the support surface 58 will occur such that proper actions (i.e., moving the blade 62 relative to the support surface 58) can be performed by the operator or the controller 14 before wheel slip occurs. The present disclosure including the traction control system 10 describes a method of predicting and minimizing wheel slip by monitoring and controlling a drag force acting on the blade 62.

In operation, the traction vehicle 18 moves along the support surface 58 in a first direction as the blade 62 is lowered into the support surface 58 by actuation of the joystick control 82 to perform a grading operation. A force is created by the support surface 58 acting on the blade 62, shown as a resultant drag force $F_1$, which is opposite from a moving force $F_2$ provided by the driven wheels 26 for movement of the fraction device 18 along the support surface 58 (FIG. 1A). As such, a net force is provided by the summation of the drag force $F_1$ and the moving force $F_2$. In order for the traction vehicle 18 to move along the support surface 58, force $F_2$ must be greater than the drag force $F_1$ (acknowledging additional forces on the vehicle due to wind resistance, rolling friction, etc.). If the net force is zero or approximate to zero, e.g., drag force $F_1$ is approximate or equal to the moving force $F_2$ (again acknowledging additional forces on the vehicle due to wind resistance, rolling friction, etc.), the driven wheels 26 will slip relative to the support surface 58.

Figure 3:
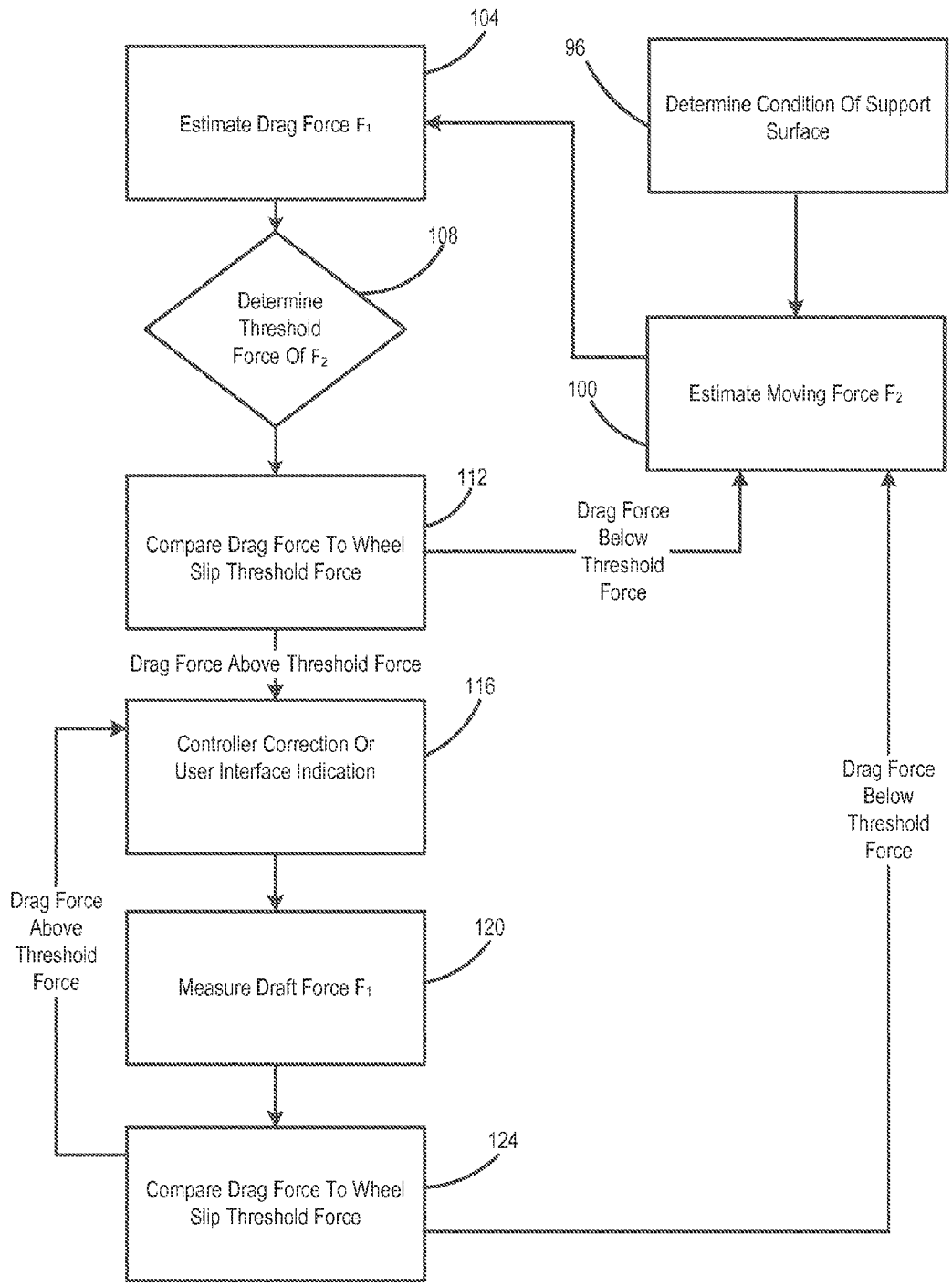
FIG. 3 is a flow chart illustrating a method of predicting and minimizing wheel slip of the fraction vehicle.

With reference to FIG. 3, the controller 14 logic of the traction control system 10 is illustrated. The operator of the traction vehicle 18 selects a tractive condition of the support surface 58 as illustrated in step 96 utilizing the user interface 38. The tractive condition relates to the friction available between the support surface 58 and the wheels 26. The friction between the support surface 58 and the wheels 26 can vary between different surface conditions (e.g., loose soil, compacted soil, etc.) as well as different weather conditions (e.g., rain, snow, etc.).

In step 100 the moving force $F_2$ supplied by the wheels 26 against the support surface 58 (FIG. 1A) is determined. The moving force $F_2$ is calculated by the controller 14 from physical parameters of the wheels 26 (e.g., circumference of the wheels 26) and torque supplied from the drivetrain 30 to the wheels 26, e.g., the torque is dependent upon the engine speed of the prime mover 34 and a gear selection of the transmission 70. The moving force $F_2$ is also dependent upon the number of wheels 26 driven by the drivetrain 30, e.g., two, four, or six wheels.

The controller 14 determines the drag force $F_1$ during step 104 through the pressure sensors 86 coupled to the lift and the blade angle hydraulic cylinders 72, 76. The calculations and equations relating the drag force $F_1$ to the pressures of the hydraulic cylinders 72, 76 are described below.

With reference to FIG. 2, the drag force $F_1$ acts on the face 66 such that the drag force $F_1$ creates a moment about pivot point B in a clockwise direction (negative direction). At the same instance, a force $F_{76}$ applied to the blade 62 by the blade angle hydraulic cylinder 76 causes a moment about pivot pin B in a counterclockwise direction (positive direction). The summation of the moments about pivot point B in a static condition are illustrated to be:

$$\Sigma M_B = F_{76} \cdot Y_2 - F_1 \cdot D_F = 0 \quad (1)$$

A vertical distance $D_F$ is defined between the drag force $F_1$ and pivot point B. The force $F_{76}$ is a function of a pressure of the blade angle hydraulic cylinder $P_{76}$ (pounds per square inch) and the diameter $D_2$ as illustrated below:

$$F_{76} = P_{76} \cdot \pi \cdot \left(\frac{D_2}{2}\right)^2 \quad (2)$$

Solving for the vertical distance $D_F$, the below relationship exists:

$$D_F = \frac{Y_2 \cdot P_{76} \cdot \pi \cdot \left(\frac{D_2}{2}\right)^2}{F_1} \quad (3)$$

A force $F_{72}$ applied to the blade arm 68 by the lift hydraulic cylinder 72 creates a moment about the pivot attachment point A in the clockwise direction, and the drag force $F_1$ creates a moment about the pivot attachment point A in the counterclockwise direction. As such, the summation of the moments about the pivot attachment point A in a static condition are illustrated below.

$$\Sigma M_A = F_1 \cdot (Y_1 - D_F) - F_{72} \cdot X_1 0 \quad (4)$$

The force $F_{72}$ is a function of a pressure of the lift hydraulic cylinder $P_{72}$ (pounds per square inch) and the diameter $D_1$ as illustrated below:

$$F_{72} = P_{72} \cdot \pi \cdot \left(\frac{D_1}{2}\right)^2 \quad (5)$$

Therefore, inserting equations (3) and (5) into equation (4) and solving for the drag force $F_1$, the following relationship exists between the drag force $F_1$ and the pressures $P_{72}$, $P_{76}$:

$$F_1 = \frac{X_1}{Y_1} P_{72} \cdot \pi \cdot \left(\frac{D_1}{2}\right)^2 + \frac{Y_2}{Y_1} P_{76} \cdot \pi \cdot \left(\frac{D_2}{2}\right)^2 \quad (6)$$

Because the pressures $P_{72}$, $P_{76}$ within the hydraulic cylinders 72, 76 are measured by the sensors 86 and the physical dimensions $X_1$, $Y_1$, $Y_2$ of the blade arm 68 are known, the drag force $F_1$ can be calculated by the controller 14.

Friction between the support surface 58 and the wheels 26 varies during different tractive conditions such that the maximum available moving force $F_2$ varies. With lower friction conditions and thus lower available moving force $F_2$, less drag force $F_1$ is necessary for the wheels 26 to slip. Through operator selection of a tractive condition from the user interface 38 (step 96), a threshold force is determined in step 108 of the controller 14 that correlates with the input support surface condition. The threshold force is a percentage or other amount of the moving force $F_2$ such as to provide an offset from the point of wheel slip (i.e., the point at which the drag force $F_1$ equals the moving force $F_2$), therefore allowing the controller 14 to react before wheel slip occurs. In one implementation, the threshold force is set at a predetermined amount below the maximum moving force $F_2$ (e.g., the threshold force is 10% less than force $F_2$) and in yet other implementations may or may not be associated with a specific tractive condition. It is generally beneficial to set the threshold force near the wheel slip threshold to maximize the performance (e.g., utility) of the blade 62. In other implementations, step 108 may directly follow step 100 of estimating the moving force $F_2$, or step 108 can be in parallel to step 100 and/or step 104.

The controller 14 proceeds to step 112 and compares the drag force $F_1$ to the threshold force. If the drag force $F_1$ is below the threshold force, the controller 14 will return to step 100, as the moving force $F_2$ is adequately above the drag force $F_1$. However, if the drag force $F_1$ is above the threshold force, the controller 14 continues to step 116.

During step 116, the controller 14 automatically corrects and reacts to the elevated amount of the drag force $F_1$. The controller 14 can perform a plurality of different corrective operations including applying a differential lock to the wheels 26 thereby increasing the moving force $F_2$, moving the blade 62 away from the support surface 58 thereby decreasing the drag force $F_1$, or, alternatively, reducing torque supplied to the wheels 26 by the drivetrain 30.

In particular, the controller 14 is operable to engage the drivetrain 30 in a differential lock condition to lock at least two wheels 26 for co-rotation. Thus, more wheels 26 are driven by the drivetrain 30 increasing the moving force $F_2$. Reduction of torque may include reducing the engine speed of the prime mover 34 and/or changing a gear ratio of the transmission 70. By reducing torque, the moving force $F_2$ decreases thereby reducing the chance that the wheels 26 will slip. In other implementations, the controller 14 may simultaneously move the blade 62, apply the differential lock, and/or reduce torque. In further implementations of step 116, the controller 14 can indicate to the operator of the traction vehicle 18 via the user interface 38 that the drag force $F_1$ is above the threshold force or that the drag force $F_1$ is approaching the threshold force. As such, the operator can manually move the blade 62 using the joystick control 82, manually apply the lock differential, and/or reduce torque of the drivetrain 30. In other implementations, the controller 14 may automatically move the blade 62, apply the lock differential, and/or reduce torque and indicate such to the operator via the user interface 38.

The controller 14 continues to measure the drag force $F_1$ as illustrated in step 120 and compares the drag force $F_1$ to the threshold force as illustrated in step 124. If the drag force $F_1$ is above the threshold force, the controller 14 defaults to step 116. In contrast, if the drag force $F_1$ decreases below the threshold force, the controller 14 returns to step 100 to continue measuring the moving force $F_2$.

In the illustrated implementation, once the drag force $F_1$ is below the threshold force, the controller 14 moves the blade 62 back to an original position of the blade 62 as observed before step 116, disengages the lock differential, and/or increases torque to an original state. The controller 14 may lower the blade 62 into the support surface 58 at a rate proportional to a difference between the drag force $F_1$ and the threshold force, or in other implementations may lower the blade 62 in any other linear or non-linear relationship to either the drag force $F_1$ or the threshold force. As such, by maintaining the drag force $F_1$ below the threshold force and ultimately the moving force $F_2$, an occurrence of wheel slip of the traction vehicle 18 is minimized.

The invention claimed is:

1. A method of minimizing the occurrence of wheel slip in a traction vehicle having a drivetrain, at least one wheel for providing tractive effort on a support surface, and a ground-engaging implement moveable relative to the support surface, the method comprising:
   estimating a first force acting against the ground-engaging implement;
   estimating a second force provided by the at least one wheel operable to move the vehicle on the support surface;
   automatically controlling the ground-engaging implement based on a difference between the first force and the second force;
   determining a threshold force from the second force based at least in part upon a tractive condition of the support surface; and
   comparing the first force with the threshold force, and wherein automatically controlling the ground-engaging implement based on the difference between the first force and the second force includes automatically controlling the ground-engaging implement based on a difference between the first force and the threshold force.

2. The method of claim 1, wherein controlling the ground-engaging implement includes moving the ground-engaging implement relative to the support surface.

3. The method of claim 1, wherein estimating the first force includes measuring a hydraulic pressure within an actuator operatively coupled to the ground-engaging implement.

4. The method of claim 1, further comprising applying a differential lock that couples the at least one wheel with a second wheel of the vehicle for co-rotation based on a difference between the first force and the threshold force.

5. The method of claim 1, further comprising reducing torque output of the drivetrain to the at least one wheel based on a difference between the first force and the threshold force.

6. A method of minimizing the occurrence of wheel slip in a traction vehicle having a drivetrain, at least one wheel for providing tractive effort on a support surface, and a ground-engaging implement moveable relative to the support surface, the method comprising:
   estimating a first force acting against the ground-engaging implement;
   estimating a second force provided by the at least one wheel operable to move the vehicle on the support surface;
   automatically applying a differential lock that couples the at least one wheel with a second wheel of the vehicle for co-rotation based on a difference between the first force and the second force;
   determining a threshold force from the second force based at least in part upon a tractive condition of the support surface; and
   comparing the first force with the threshold force, and wherein automatically applying the differential lock based on the difference between the first force and the second force includes automatically applying the differential lock based on a difference between the first force and the threshold force.

7. The method of claim 6, wherein estimating the first force includes measuring a hydraulic pressure within an actuator operatively coupled to the ground-engaging implement.

8. The method of claim 6, further comprising reducing torque output of the drivetrain to the at least one wheel based on the difference between the first force and the threshold force.

9. The method of claim 6, further comprising automatically controlling a ground-engaging implement based on the difference between the first force and the threshold force.

10. The method of claim 9, wherein automatically controlling the ground-engaging implement includes moving the ground-engaging implement relative to the support surface.

11. A system for minimizing the occurrence of wheel slip in a traction vehicle having a drivetrain, at least one wheel for providing tractive effort on a support surface, and a ground-engaging implement moveable relative to the support surface, the system comprising a controller configured to:
   estimate a first force acting against the ground-engaging implement;
   estimate a second force provided by the at least one wheel operable to move the vehicle on the support surface; and
   control at least one of the ground-engaging implement or the drivetrain based on a difference between the first force and the second force,
   wherein the controller is configured to determine a threshold force from the second force based at least in part upon a tractive condition of the support surface, wherein the controller is configured to compare the first force with the threshold force, and wherein the controller is further configured to move the ground-engaging implement or engage the drivetrain in a differential lock condition based on a difference between the first force and the threshold force.

12. The system of claim 11, wherein the controller is configured to measure a hydraulic pressure within an actuator operatively coupled to the ground-engaging implement.

13. The system of claim 11, wherein the controller reduces torque output of the drivetrain to the at least one wheel.

14. The system of claim 13, wherein the controller is further configured to reduce torque from the drivetrain based on a difference between the first force and the threshold force.

* * * * *